US009126459B2

(12) United States Patent
Stewart et al.

(10) Patent No.: US 9,126,459 B2
(45) Date of Patent: Sep. 8, 2015

(54) APPARATUS AND METHODS FOR DETERMINING THE POSITION AND/OR ORIENTATION OF A TIRE MOUNTED UNIT IN A WHEEL MONITORING SYSTEM

(75) Inventors: William David Stewart, Antrim (GB); Stephen John Robb, Antrim (GB)

(73) Assignee: Schrader Electronics Limited, Antrim (GB)

( * ) Notice: Subject to any disclaimer, the term of this patent is extended or adjusted under 35 U.S.C. 154(b) by 47 days.

(21) Appl. No.: 13/823,646

(22) PCT Filed: Sep. 15, 2011

(86) PCT No.: PCT/EP2011/066051
§ 371 (c)(1),
(2), (4) Date: Mar. 29, 2013

(87) PCT Pub. No.: WO2012/035121
PCT Pub. Date: Mar. 22, 2012

(65) Prior Publication Data
US 2013/0207796 A1    Aug. 15, 2013

(30) Foreign Application Priority Data
Sep. 16, 2010   (GB) .................................. 1015520.8

(51) Int. Cl.
*B60C 23/00* (2006.01)
*B60C 23/04* (2006.01)

(52) U.S. Cl.
CPC ............. *B60C 23/00* (2013.01); *B60C 23/0416* (2013.01); *B60C 23/0488* (2013.01); *B60C 23/0489* (2013.01)

(58) Field of Classification Search
CPC    B60C 23/04; B60C 23/0408; B60C 23/0416; B60C 23/0488; B60C 23/0489; B60C 23/00
USPC .............. 340/442–448, 686.1; 701/29.1, 34.4
See application file for complete search history.

(56) References Cited

U.S. PATENT DOCUMENTS

| 7,336,161 | B2 * | 2/2008 | Walraet .......................... 340/442 |
| 2003/0236604 | A1 * | 12/2003 | Lu et al. ......................... 340/442 |
| 2006/0012469 | A1 * | 1/2006 | Hirai .............................. 340/445 |
| 2008/0197995 | A1 | 8/2008 | Taki |
| 2008/0243335 | A1 | 10/2008 | Rao et al. |

FOREIGN PATENT DOCUMENTS

| DE | 102007014765 A1 | 10/2008 |
| EP | 1593532 A2 | 11/2005 |
| WO | 2006100577 A1 | 9/2006 |

* cited by examiner

*Primary Examiner* — Thomas Mullen
(74) *Attorney, Agent, or Firm* — Holland & Hart LLP

(57) ABSTRACT

An apparatus for determining the position and/or orientation of a tire mounted unit in a wheel monitoring system comprises a lateral force sensor that is responsive to forces exerted on the respective tire along a lateral axis that is parallel with an axle of the vehicle on which the tire is mounted. The lateral force sensor is arranged to produce an output signal that indicates the direction of the exerted forces. A controller determines the position and/or orientation of the tire unit depending on the exerted force direction indicated by the output signal.

22 Claims, 13 Drawing Sheets

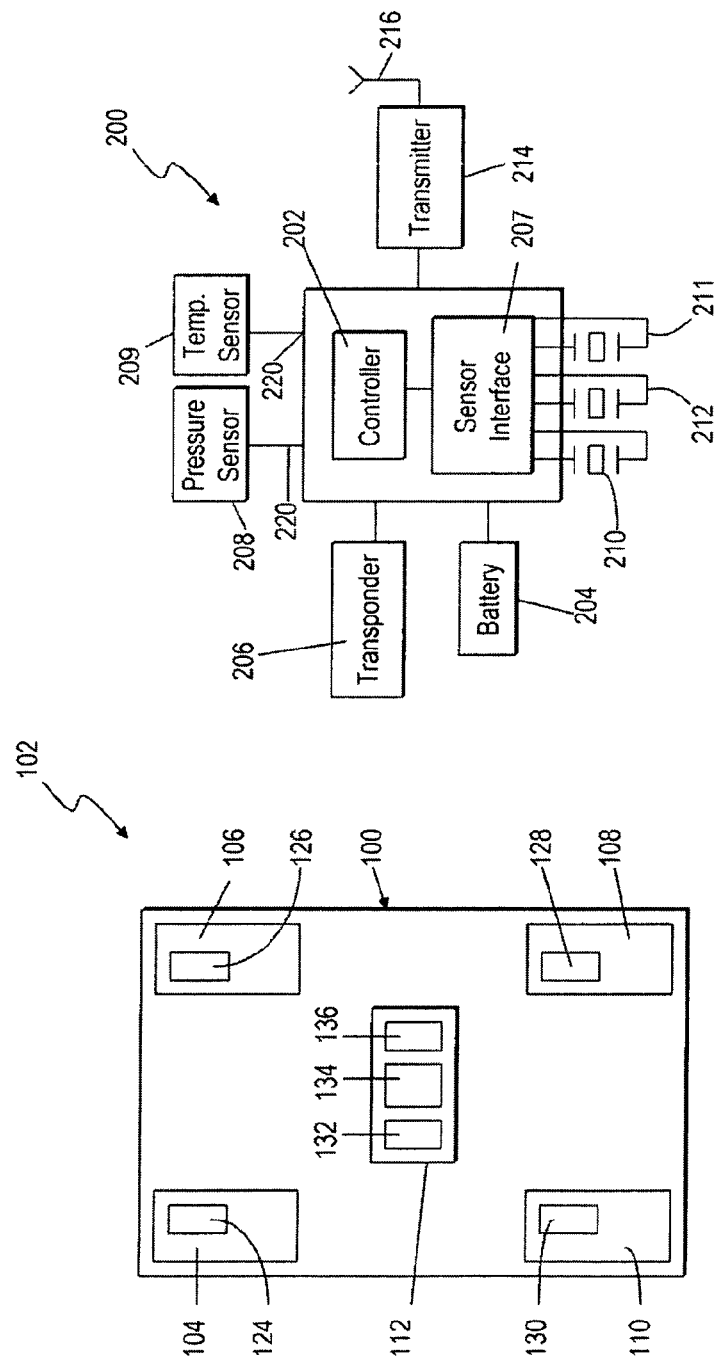

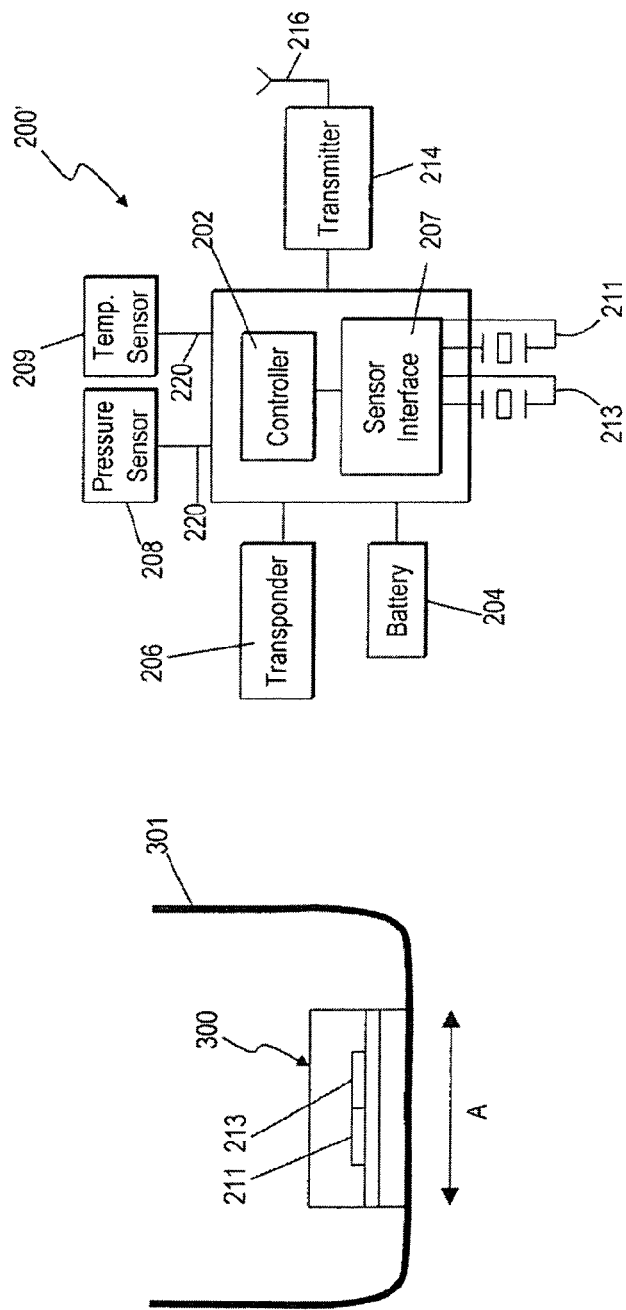

APPARATUS AND METHODS FOR DETERMINING THE POSITION AND/OR ORIENTATION OF A TIRE MOUNTED UNIT IN A WHEEL MONITORING SYSTEM

CROSS-REFERENCES

This application is a US National phase of pending application PCT/EP2011/066051, filed Sep. 15, 2011, entitled "APPARATUS AND METHODS FOR DETERMINING THE POSITION AND/OR ORIENTATION OF A TYRE MOUNTED UNIT IN A WHEEL MONITORING SYSTEM", which claims priority from pending patent application Ser. No. 1015520.8, filed Sep. 16, 2010, entitled "APPARATUS AND METHODS FOR DETERMINING THE POSITION AND/OR ORIENTATION OF A TYRE MOUNTED UNIT IN A WHEEL MONITORING SYSTEM" which are hereby incorporated by reference, as if set forth in full in this document, for all purposes.

FIELD OF THE INVENTION

The present invention relates to wheel monitoring systems, especially Tyre Pressure Monitoring Systems (TPMS). The invention relates particularly to determining the position and/or orientation of tyre mounted units with respect to a vehicle.

BACKGROUND TO THE INVENTION

Systems have been developed for monitoring characteristics, such as tyre pressure and/or tyre temperature, of the wheels of a vehicle. A wheel mounted unit comprising one or more appropriate sensor(s) is located at each wheel, typically inside the tyre, which measures the relevant characteristic(s) and transmits corresponding information to a remote central monitoring station. It is desirable for the central monitoring system to know the location of the respective wheel mounted units so that the measured characteristics can be associated with the respective wheels. This can be achieved by manually programming the system in a calibration process. It is preferable, however, for the system to be able to automatically determine the position of the wheel mounted units.

One problem with such auto-location of wheel units is the determination of whether the tyre mounted unit is located on the left or right side of the vehicle. One solution to this problem is to determine left or right location by detecting the direction of rotation of a tyre mounted unit that is incorporated into the valve of the tyre. This can be achieved by comparing the phase difference between two shock sensors provided in the valve mounted unit. For valve mounted units this method works well as the unit is always mounted in the same orientation with respect to the wheel (the unit is always orientated with the valve pointed away from the vehicle).

In some systems, however, the wheel unit is mounted on the tyre itself (commonly known as tyre mounted sensors) rather than on the valve. In such cases, there is an added complication; the orientation of the tyre, and the monitoring unit within the tyre, with respect to the wheel and hence the vehicle cannot be assumed. This is a problem in systems where the orientation of the sensors must be known in order to make a correct left/right determination. Once orientation is determined, then the solution using two shock sensors (or equivalent devices) or any other solution that can determine orientation of rotation (clockwise/anticlockwise) can be used to perform left/right determination It would be desirable to provide improved apparatus and methods for determining the position and/or orientation of a tyre mounted unit in a wheel monitoring system

SUMMARY OF THE INVENTION

A tyre monitoring system for a vehicle, the system comprising
a plurality of tyre units, each tyre unit being mountable on a respective tyre in at least a first orientation or a second orientation and comprising
at least one sensor for detecting one or more characteristics of the respective tyre,
a lateral force sensor that is responsive to forces exerted on the respective tyre along a lateral axis that is parallel with an axle of the vehicle on which the respective tyre is mounted in use, said lateral force sensor being arranged to produce an output signal that indicates the direction of said exerted forces,
control means arranged to determine whether a respective tyre unit is mounted in said first orientation or said second orientation depending on said exerted force direction indicated by said output signal.

Preferably, said control means is arranged to detect one or more peaks in said output signal and to determine whether said respective tyre unit is mounted in said first orientation or said second orientation depending on the polarity of said detected one or more peaks.

Preferably, said control means is arranged to detect a first peak after a quiescent period in said output signal and to determine whether said respective tyre unit is mounted in said first orientation or said second orientation depending on the polarity of said first peak A second aspect of the invention provides a tyre monitoring system for a vehicle, the system comprising
a plurality of tyre units, each tyre unit comprising
at least one sensor for detecting one or more characteristics of the respective tyre,
a longitudinal force sensor that is responsive to forces exerted on the respective tyre along a longitudinal axis that is substantially tangential to a footprint section of the tyre during use, said longitudinal force sensor being arranged to produce an output signal that indicates the direction of said longitudinally exerted forces, and
control means arranged to detect changes in said longitudinal force direction indicated by said output signal and to determine whether a respective tyre unit is mounted on the left side or the right side of said vehicle depending on said detected changes.

Preferably, said control means is arranged to detect at least two successive peaks in said output signal and to determine whether said respective tyre unit is mounted on the left side or the right side of said vehicle depending on the respective polarities of said detected at least two successive peaks.

Preferably, said control means is arranged to detect a first peak after a quiescent period in said output signal and a successive second peak in said output signal, said first peak having a first polarity and said second peak having a second polarity opposite to said first polarity, and to determine whether said respective tyre unit is mounted on the left side or the right side of said vehicle depending on the respective polarity of said first and second peaks.

A third aspect of the invention provides a tyre unit for a tyre monitoring system for a vehicle, the tyre unit being mountable on a respective tyre in a first orientation or a second orientation and comprising at least one sensor for detecting one or more characteristics of the respective tyre, and a lateral force sensor that is responsive to forces exerted on the respective tyre along a lateral axis that is parallel with an axle of the vehicle on which the respective tyre is mounted in use, said lateral force sensor being arranged to produce an output signal that indicates the direction of said exerted forces, and wherein said tyre unit includes, or is co-operable with control means arranged to determine whether a respective tyre unit is mounted in said first orientation or said second orientation depending on said exerted force direction indicated by said output signal.

A fourth aspect of the invention provides a tyre unit for a tyre monitoring system for a vehicle, the tyre unit comprising at least one sensor for detecting one or more characteristics of the respective tyre, a longitudinal force sensor that is responsive to forces exerted on the respective tyre along a longitudinal axis that is substantially tangential to a footprint section of the tyre during use, said longitudinal force sensor being arranged to produce an output signal that indicates the direction of said longitudinally exerted forces, and wherein the tyre unit includes, or is co-operable with control means arranged to detect changes in said longitudinal force direction indicated by said output signal and to determine whether a respective tyre unit is mounted on the left side or the right side of said vehicle depending on said detected changes.

A fifth aspect of the invention provides a method of determining the orientation of a tyre unit of a vehicle tyre monitoring system, the system comprising a plurality of tyre units, each tyre unit being mountable on a respective tyre in a first orientation or a second orientation, the method comprising:

detecting a force exerted on the respective tyre along a lateral axis that is parallel with an axle of the vehicle on which the respective tyre is mounted in use;

determining the direction of said force exerted along said lateral axis; and determining whether the respective tyre unit is mounted in said first orientation or said second orientation depending on said determined direction of said exerted force.

A sixth aspect of the invention provides a method of determining the left or right location of a tyre unit in a vehicle tyre monitoring system, the tyre unit being mounted on a tyre on the left or right side of the vehicle, the method comprising:

detecting a force exerted on the respective tyre along a longitudinal axis that is substantially tangential to a footprint section of the tyre during use;

determining the direction of said force exerted along said longitudinal axis;

detecting changes in the direction of said longitudinal force; and determining whether said tyre unit is mounted on the left side or the right side of said vehicle depending on said detected changes.

Further preferred features are recited in the dependent claims.

The lateral and/or longitudinal force sensors may comprise any sensor that is responsive to force or acceleration to produce a suitable output signal. By way of example, said force sensors may comprise a shock sensor, an accelerometer or other accelerometric device.

In arriving at the present invention, it is observed that one of the components of force exerted on a section of tyre as it contacts the road surface while rolling is in the lateral direction (i.e. parallel with the vehicle axle). In area of the tyre where the tyre is not in contact with road this force is substantially constant. However as the tyre strikes the road this force changes. For example, the force may increase sharply then instantly become zero during the footprint region (i.e. when the tyre section is in contact with the road) before returning to a substantially constant value. The positive direction of this lateral force acts dependent on which side of the vehicle the tyre is located. In preferred embodiments, it is assumed that the vector of this lateral force is always in a direction towards the vehicle, i.e. the lateral force is positive in a direction inwardly of the vehicle. Hence, the orientation of a tyre mounted unit which respect to the vehicle can be determined from the output signal of a sensor, for example a shock sensor, that is arranged to measure said lateral force, or which is at least responsive to said lateral force. In particular, the orientation of the sensor, and hence the tyre mounted unit, can be determined depending on whether the experienced lateral force is positive or negative as the section of the tyre that carries the sensor strikes the road.

The determination of the orientation of the tyre mounted unit with respect to the tyre can be used to interpret the output of other components of the system. For example if, as in the conventional valve-mounted sensor, the lateral sensor is orientated away from the vehicle, then sensor may experience a positive pulse. If this is the case, then the data given by the two shock sensors that are used to determine left/right location is true and will give a correct indication of orientation of rotation. However, if a negative pulse is detected by the lateral sensor, then this indicates that the lateral sensor is orientated into the vehicle and the orientation of rotation indicated by the two shock sensors needs to be inverted.

It is further observed that the longitudinal force (tangential) that a section of tyre experiences as it contacts the road is similar to the lateral force in that it is polarized. In the case of longitudinal force, as the tyre strikes the road there is a negative pulse force (with the sensor in a specific orientation) when the tyre section contacts the road followed by a positive pulse force as the section of tyre exits the road contact region. If the sensor already knows the orientation of the tyre mounted unit, e.g. by means of the first aspect of the invention, then by using one additional shock sensor, or other suitable sensor, it is possible to determine the orientation of rotation (L/R) by detecting if the longitudinal force pattern is −ve+ve or +ve−ve. This means that by using two shock sensors, or other suitable sensors, L/R sensor location can be determined.

This aspect of the invention enables the clockwise/anti-clockwise determination, and hence the L/R location of the tyre mounted unit, using just one sensor (assuming that the orientation of the unit is known). This offers a smaller and cheaper solution for L/R determination.

Further advantageous aspects of the invention will become apparent to those ordinarily skilled in the art upon review of the following description of a specific embodiment and with reference to the accompanying drawings.

BRIEF DESCRIPTION OF THE DRAWINGS

Embodiment of the invention are now described by way of and with reference to the accompanying drawings example in which like numerals are used to denote like parts and in which:

FIG. 1 is a block diagram of an embodiment of a tyre monitoring system (TMS) shown in conjunction with parts of a vehicle;

FIG. 2 is a block diagram of a tyre monitoring apparatus included in the TMS of FIG. 1;

FIG. 3 is a schematic view of part of a tyre including an internally mounted tyre monitoring unit;

FIG. 6 is a block diagram of an alternative embodiment of the tyre monitoring apparatus included in the TMS of FIG. 1;

DETAILED DESCRIPTION OF THE DRAWINGS

Figure 4:
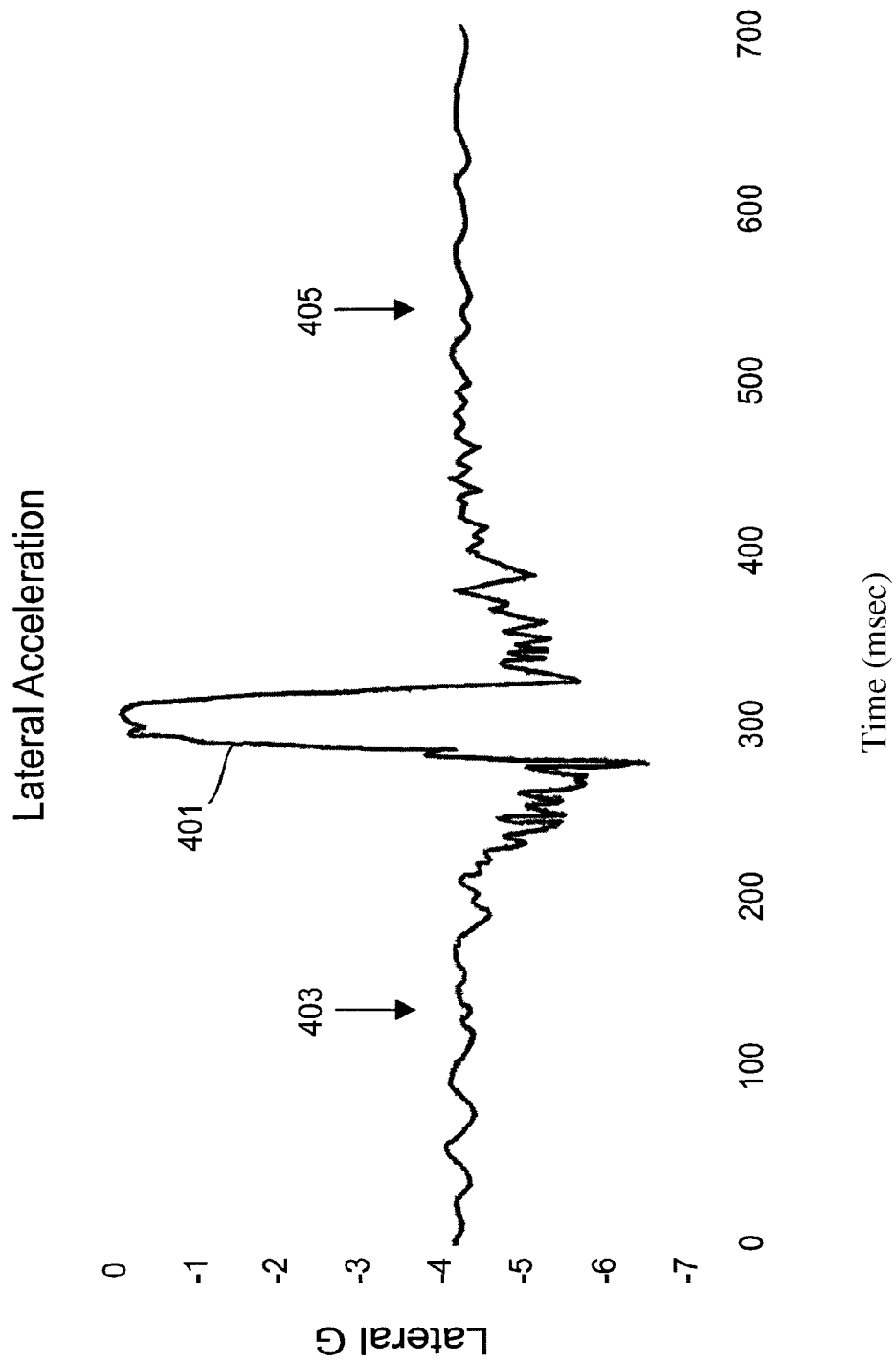
FIG. 4 is a graph illustrating lateral acceleration against time for a first orientation of the tyre monitoring unit.

Referring now to FIG. 1 of the drawings, there is shown, generally indicated as 102, a tyre monitoring system (TMS) shown in situ on a vehicle 100. For reasons of clarity, only those portions of the vehicle 100 and TMS 102 that are helpful in understanding the present invention are shown.

The vehicle 100 includes wheels 104, 106, 108, 110, each wheel including a tyre mounted on a rim. The TMS 102 includes a control unit 112 (such as a vehicle engine control unit (ECU), or a Body Control Module (BCM)) and tyre monitors 124, 126, 128, 130, typically generally referred to as sensors, transmitters, wheel units, or the like. The tyre monitors 124, 126, 128, 130 measure tyre characteristics and transmit corresponding tyre data for reception and processing by the control unit 112. Typically, a respective tyre monitor is associated with each wheel of the vehicle 100.

In typical embodiments, the tyre monitors are capable of measuring tyre pressure and of transmitting data to the control unit 112, including data representing the measured tyre pressure and usually also identification information uniquely identifying the respective tyre monitor. Each of the tyre monitors 124, 126, 128, 130 includes a suitably powered wireless transmitter, conveniently a battery (or otherwise) powered radio frequency (RF) transmitter, and a pressure sensor for measuring the pressure of the gas (usually air) within the tyre. In such embodiments, the system 102 may be referred to as a tyre pressure monitoring system (TPMS).

Any suitable control unit may be used in the system 102. By way of example, in the illustrated embodiment, the control unit 112 includes a controller 132 (e.g. the vehicle ECU), a memory device 134 and a receiver 136 for receiving wireless transmissions from the tyre monitors.

Referring now to FIG. 2, there is shown a block diagram of an embodiment of a tyre monitor 200. The tyre monitor 200 includes a controller 202, a power source such as a battery 204, a transponder coil 206, a pressure sensor 208, one or more piezoelectric motion sensors 210 212, a wireless transmitter 214 and an antenna 216. It will be apparent that the monitor 200 typically also includes a temperature sensor for measuring the temperature of the tyre and/or of the gas within the tyre. In this illustration, the motion sensors 210, 212 each comprise a respective shock sensor of the type that produces an electrical signal in response to being subjected to acceleration (typically shock sensors are responsive to changes in acceleration), the electrical signal being indicative of, typically proportional to, the experienced acceleration or change in acceleration, especially the rate of change of acceleration. Alternatively, the sensor 210, 212 may each comprise an accelerometer or a microelectromechanical systems (MEMS) sensor. The main difference between an accelerometer and a shock sensor is that the output signal from a shock sensor is related to a change of force applied to the shock sensor, whereas the output signal from an accelerometer is proportional to the absolute force applied.

During use, the controller 202 is able to determine at least one aspect of the tyre monitor's location, for example whether it is on the left side or the right side of the vehicle, based on electrical signals produced by the shock sensors 210, 212 as the wheel rotates. Such a determination is possible only if the orientation of the tyre monitor 200 with respect to the tyre is known.

The shock sensors 210, 212 may serve as a motion switch or rotational sensor for the tyre monitor 200. The shock sensors 210, 212 may in combination form a dual axis accelerometer and determine first acceleration along a first axis and second acceleration along a second axis. The shock sensors 210, 212 are one example of a force sensor, displacement sensor, or rotation sensor. The shock sensors may also be referred to generically as piezoelectric rotation sensors. Other types of piezoelectric rotation sensors, or other types of force sensor, displacement sensor or rotation sensor may be used in place of the shock sensors described herein.

Hence, in the illustrated embodiment, the shock sensors 210, 212 may be used both as a motion switch, to determine when the tyre is moving, and to determine what side of the vehicle the tyre is located on. The shock sensors 210, 212 are coupled with the controller 202.

The controller 202 may be implemented by any suitable means, for example a microprocessor, microcontroller or other suitable data processing device programmed to perform the functions described herein.

In the illustrated embodiment, the pressure sensor 208 detects the pneumatic air pressure of the tyre with which the tyre monitor 200 is associated. The temperature sensor 209 measures the temperature of the tyre and/or of the air within the tyre. In alternative embodiments, the pressure sensor 208 may be supplemented with or replaced by other devices for detecting tyre data. An indication of the tyre data is provided by the controller 202 at an input 220.

A shock sensor interface 207 is provided in the tyre monitor 200 and is configured to provide the necessary control signals and detect the electrical signals from the shock sensors 210, 211, 212. The shock sensors 210, 212 in one embodiment are responsive to acceleration to produce an output in the form of an electrical charge output signal. The output signal is typically on the order of 1 mV/g. The shock sensor interface 207 receives the electrical output signal, which is analog in nature, amplifies and filters the signal to provide a corresponding processed output signal to the controller 202. The shock sensor interface 207 operates in response to control signals from the controller 202. Preferably, shock sensors 210, 211, 212 can share the same interface 207 via multiplexing.

Any suitable methods may be used to provide the right/left and/or clockwise/counter-clockwise information from shock sensors 210, 212. For example, commonly owned Wacker, U.S. Pat. No. 6,204,758 discloses a system to automatically determine wheel position for automotive remote tyre monitoring system, which is incorporated herein by reference. Therein, it is taught that during different operating conditions, tyres mounted on a vehicle experience acceleration which can be detected at a tyre monitor. The polarity of the acceleration varies in accordance with the location of the tyre monitor on the right or left side of the vehicle. The acceleration information can be used to determine the position of the tyre monitor and its associated wheel on the vehicle. In particular, Wacker teaches that tyre monitors on opposing sides of the vehicle will experience oppositely directed tangential acceleration. In one example, the sign of the detected tangential acceleration will correspond to the side of the vehicle, with positive acceleration indicating location on the left side of the vehicle and negative acceleration indicating location on the right side of the vehicle.

However, preferably, systems and methods to provide the right/left and/or clockwise/counter-clockwise information such as disclosed in commonly owned Stewart, et al., U.S. Pat No. 7,367,227, entitled Determination of Wheel Sensor Position Using Shock Sensors and a Wireless Solution are used. Therein, first shock sensor 210 produces a first motion signal, second shock sensor 212 produces a second motion signal and controller 202 is coupled to the first shock sensor and the second shock sensor. A controller circuit is configured to determine right side-left side position information for the tyre monitor based on a lag-lead relationship of the first motion signal and the second motion signal. For example, as a wheel rotates, two waveforms are produced by the shock sensors, which are out of phase by 90 degrees. Depending on the direction of rotation of the wheel, clockwise or counterclockwise, one axis will lead or lag the other axis. Shock sensors convert the acceleration they detect into signals such as voltage waveforms. These signals, including a first signal for acceleration on one axis and a second signal for acceleration on a second axis, can then be amplified, filtered and converted to digital data by the controller of the tyre monitor. Position information about position of a tyre including the tyre monitor can then be determined based on the signal. A decision can subsequently be made as to whether the tyre monitor is rotating in a clockwise or counterclockwise direction, based on the sampled signals from the shock sensors. The position information, such as right hand side positioning or left hand side positioning can be determined from the direction of rotation. In particular, the controller of the tyre monitor can determine a lag/lead relationship of the first acceleration signal for the x axis and the second acceleration signal of the z axis. The controller determines whether the x axis leads or lags the z axis signal. This lag/lead information will indicate either clockwise or counterclockwise rotation information, and information that the vehicle is travelling forward rather than backing up, on the basic of which the controller can determine whether the tyre monitor is on the right-hand side or the left-hand side of the vehicle. For directional rotation, the disclosed method and apparatus may analyze the alternating +1 g/−1 g component.

FIG. 3 shows part of a tyre 301 having a tyre monitoring unit 300 mounted therein. Typically the unit 300 is mounted on an internal surface of the tyre 301, especially on the inside of the tread rather than the side wall, by any convenient means. Tyre monitoring units of this type are commonly referred to as a tyre mounted sensor (TMS). A problem with such units 300 is that they can be mounted in one of two possible orientations, the two orientations being separated by 180° about an axis that is normal to the tread. When using one or more sensors in a tyre monitoring unit to determine whether the unit is in a left hand side wheel or a right hand side wheel, e.g. using one or other of the methods identified above, the orientation of the sensor(s) with respect to the tyre, and therefore the vehicle, must be known in order to make a correct determination.

In order to address this problem, tyre mounted units 200, 300 embodying one aspect of the present invention are provided with a sensor 211 for detecting force, or acceleration, experienced by the tyre along a lateral axis, i.e. an axis parallel with the vehicle axle (not shown) or the rotational axis of the wheel, as indicated by arrow A in FIG. 3. The sensor 211 is at least capable of producing an output signal in response to such lateral force, or acceleration, that is indicative of the direction of the lateral force, or acceleration. In use, this corresponds to an indication of whether the force/acceleration is directed inwardly or outwardly of the vehicle. Conveniently, the sensor 211 comprises a shock sensor that may be the same or similar to the shock sensors described above. Alternatively, the sensor 211 may take any other suitable form, e.g. acceleration sensor, accelerometric device, accelerometer or force sensor. Typically, the sensor 211 is configured to detect forces along a single detection axis and so it is arranged in the unit 200, 300 such that, when the unit is mounted on a tyre 301, the detection axis is substantially parallel with the lateral axis. In cases where the sensor 211 has more than one detection axis, it is arranged in the unit 200, 300 such that, when the unit is mounted on a tyre 301, a nominated one of the detection axes is substantially parallel with the lateral axis. In either case, the sensor 211 is capable of determining the direction of the experienced lateral force along the relevant detection axis and of producing an output signal that is indicative of the force direction.

Depending on its type, the sensor 211 may for example produce an output signal that comprises a (direct or indirect) measure of the experienced lateral force, or an output signal that indicates changes in the experienced lateral force. For example, in the case where the sensor 211 comprises a shock sensor, its output signal is indicative of changes in the experienced force (or more particularly changes in acceleration), whereas in the case where the sensor 211 comprises an accelerometer, the output signal is a measure of the experienced acceleration.

Figure 5:
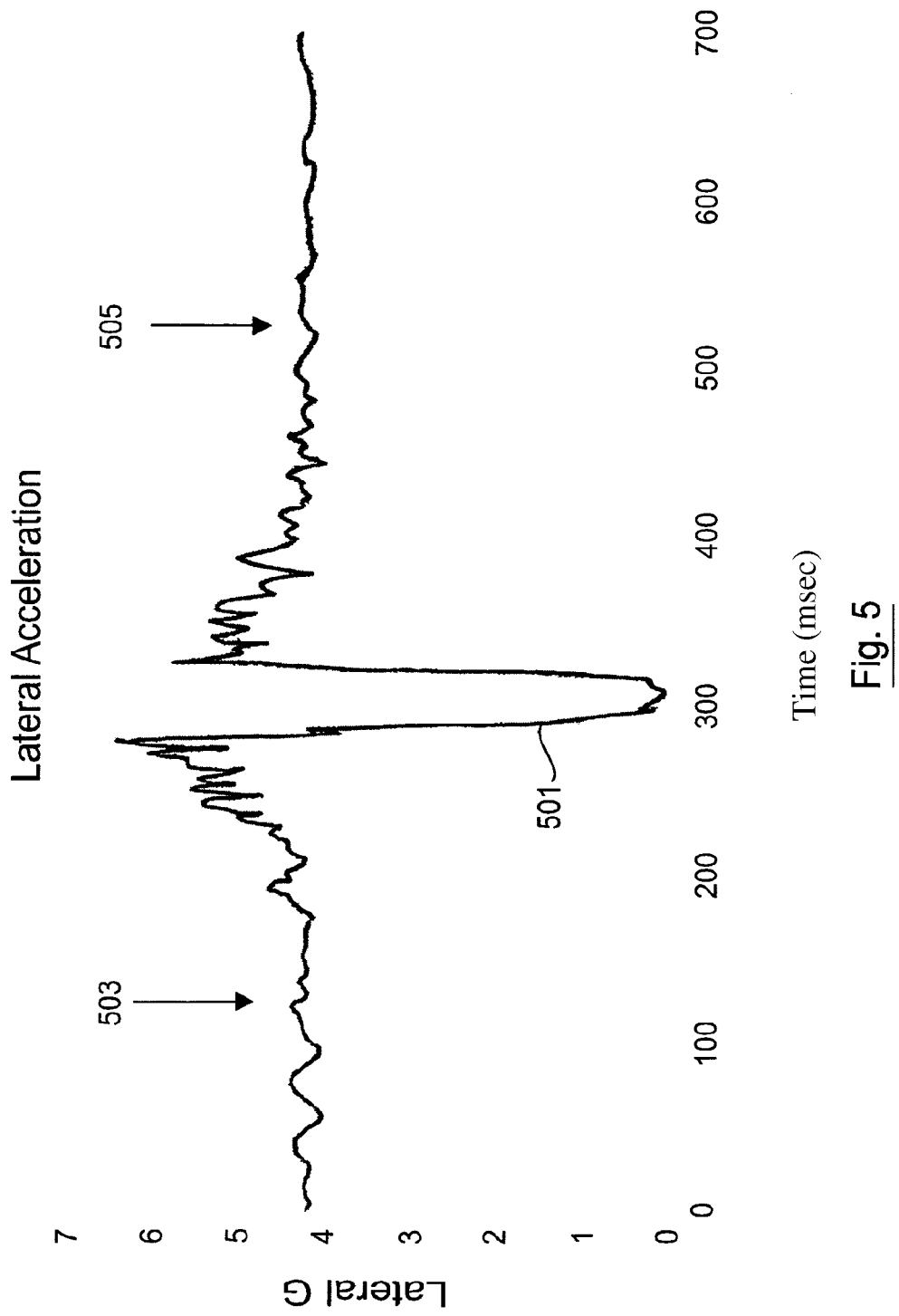
FIG. 5 is a graph illustrating lateral acceleration against time for a second orientation of the tyre monitoring unit.

Referring now to FIGS. 4 and 5 there is shown respective graphs illustrating typical acceleration over time that may be experienced by the sensor 211 along the lateral axis. It can be seen that the acceleration is characterised by a peak 401, 501 that occurs between periods 403, 405 and 503, 505 during which the experienced acceleration is relatively constant. The peak 401, 501 corresponds to the section of the tyre 301 that includes the unit 200, 300 making contact with the road surface (not shown).

It is observed that the direction of the lateral force experienced by the tyre as it makes contact with the road surface is dependent on the location of the tyre with respect to the vehicle, i.e. the force may be directed inwardly or outwardly of the vehicle. Typically, it is observed that the lateral force is directed inwardly of the vehicle. FIGS. 4 and 5 show how the experienced acceleration differs depending on the orientation of the sensor 211 with respect to the tyre. Since the sensor 211 is capable of detecting the direction of the force experienced along the detection axis, depending on which of the two possible oppositely disposed orientations that the tyre mounted unit 200, 300 and therefore the sensor 211 adopts, the peak 401, 501 is either negative (FIG. 4) or positive (FIG. 5). Hence, by determining whether the peak 401, 501 is negative or positive, a determination can be made as to how the sensor 211 is orientated with respect to the vehicle. This also allows a determination to be made as to how the sensor 211, and therefore the unit 200, 300, is orientated with respect to its wheel or tyre. In the case where the lateral force is directed inwardly of the vehicle, a positive peak is experienced when the sensor 211 is orientated to detect positive force in a direction inwardly of the vehicle and a negative peak is experienced when the sensor 211 is orientated to detect positive force in a direction inwardly of the vehicle. Once the TMS 102 knows how the sensor 211 is orientated with respect to the vehicle/wheel, it can determine how to interpret the output signals received from other components in the same tyre mounted unit 200, 300, e.g. the sensors 201, 212.

It is noted that the signals shown in FIGS. 4 and 5 are not necessarily representative of the output of the sensor 211, since this will depend on the type of the sensor 211. For example, an accelerometer may produce a signal that is substantially the same as those shown in FIGS. 4 and 5 (or proportional to them), whereas a shock sensor may produce a signal having a positive or negative pulse corresponding to the positive or negative peak respectively.

In cases where the sensor 211 is implemented as a separate sensor, and where a two sensor solution is employed to determine left or right location, the tyre mounted unit 200 has 3 separate sensors (as shown in FIG. 2). Alternatively, a single 3 axis accelerometer, or a dual axis accelerometer plus a separate sensor could be used. This may be considered undesirable in terms of cost and space requirements.

In order to mitigate this problem, tyre mounted units 200' (FIG. 6) embodying another aspect of the present invention are provided with a sensor 213 for detecting force, or acceleration, experienced by the tyre along an axis that is parallel with the direction of movement of the wheel (and the vehicle when moving straight ahead). This axis is hereinafter referred to as the longitudinal axis of the tyre, and may be said to be tangential with the portion of the tyre that engages the road surface. The sensor 213 is at least capable of producing an output signal in response to such longitudinal force or acceleration that is indicative of the direction of the longitudinal force along the longitudinal axis. Conveniently, the sensor 213 comprises a shock sensor that may be the same or similar to the shock sensors described above. Alternatively, the sensor 213 may take any other suitable form, e.g. acceleration sensor, accelerometric device, accelerometer or force sensor. Typically, the sensor 213 is configured to detect forces along a single detection axis and so it is arranged in the unit 200' such that, when the unit is mounted on a tyre 301, the detection axis is substantially parallel with the longitudinal axis. In cases where the sensor 213 has more than one detection axis, it is arranged in the unit 200' such that, when the unit is mounted on a tyre 301, a nominated one of the detection axes is substantially parallel with the longitudinal axis. In either case, the sensor 213 is capable of determining the direction of the experienced longitudinal force along the relevant detection axis and of producing an output signal that is indicative of the force direction.

Depending on its type, the sensor 213 may for example produce an output signal that comprises a (direct or indirect) measure of the experienced longitudinal force, or an output signal that indicates changes in the experienced longitudinal force. For example, in the case where the sensor 213 comprises a shock sensor, its output signal is indicative of changes in the experienced force (or more particularly changes in acceleration, e.g. rate of change of acceleration), whereas in the case where the sensor 213 comprises an accelerometer, the output signal is a measure of the experienced acceleration.

It is observed that the direction of the longitudinal force experienced by a section of the tyre as it strikes the road surface is opposite to the direction of the longitudinal force experienced by the tyre as it disengages from the road surface. Therefore, as a section of the tyre passes through the footprint region, it experiences successive peaks, or pulses, in longitudinal force that are opposite in direction, a first being experienced as the tyre section strikes the road and a second being experienced as the tyre section disengages from the road.

Figure 7:
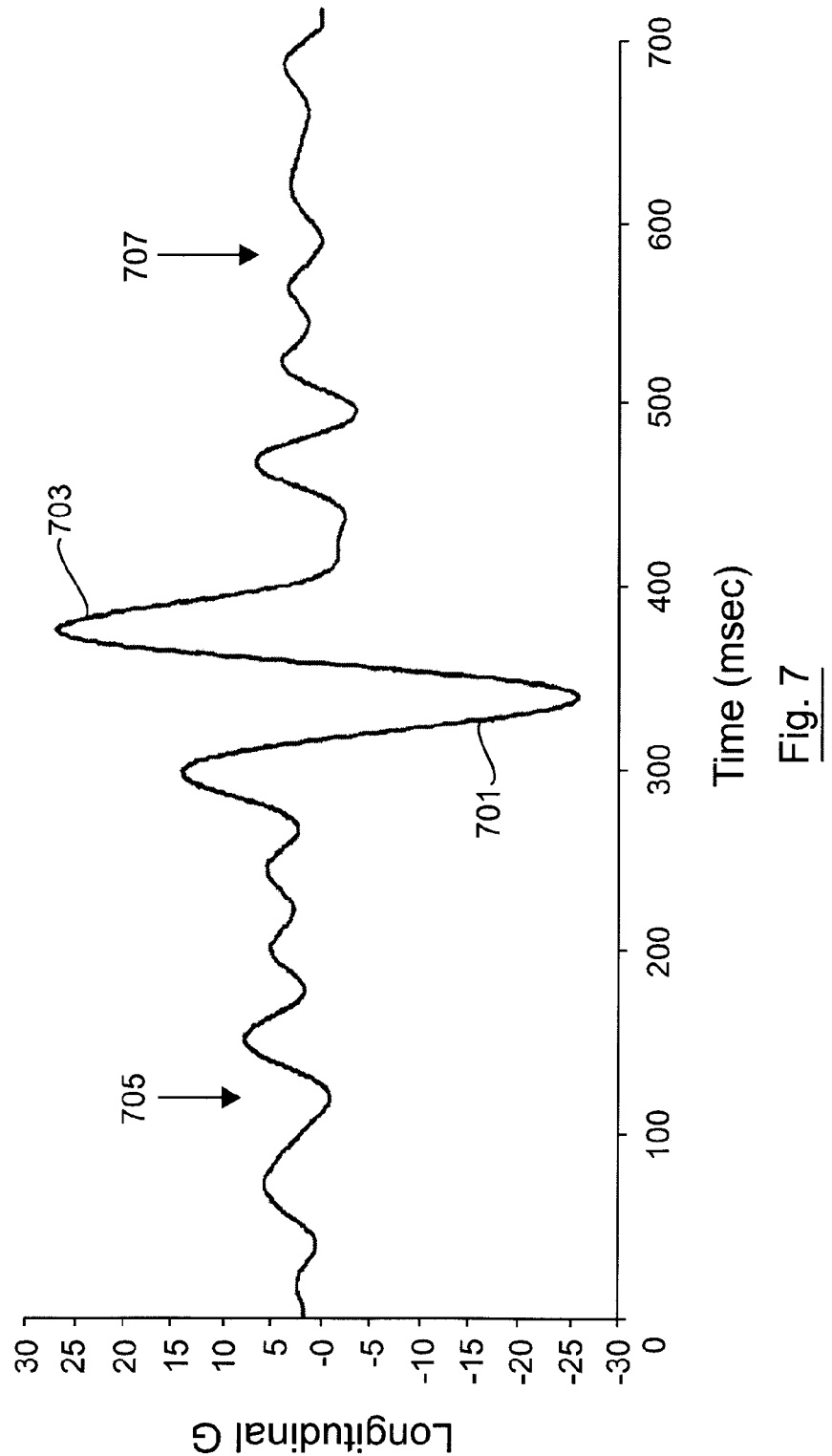
FIG. 7 is a is a graph illustrating longitudinal acceleration against time for tyre monitoring unit located in a right hand side wheel.
Figure 8:
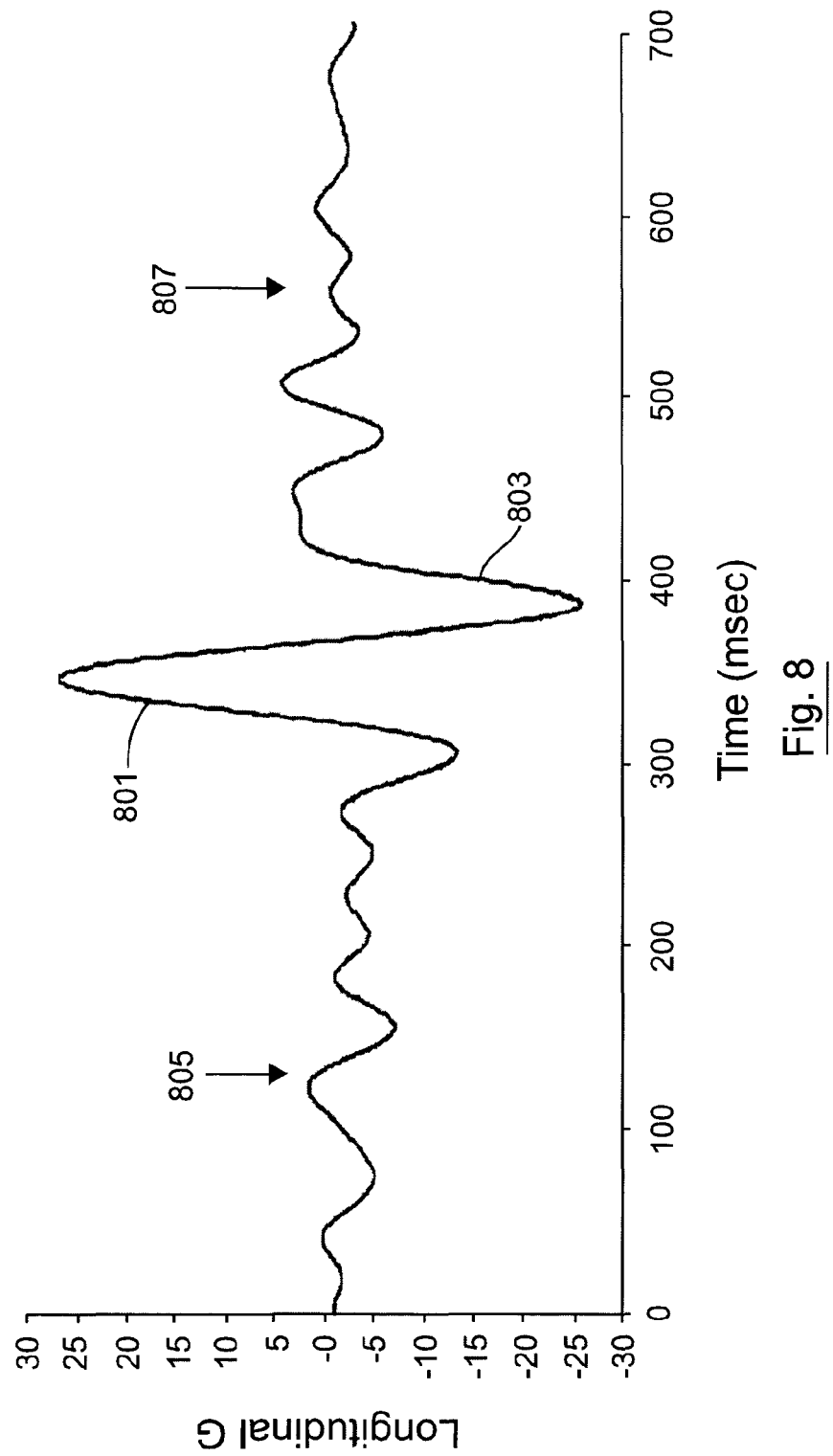
FIG. 8 is a is a graph illustrating longitudinal acceleration against time for tyre monitoring unit located in a left hand side wheel.

Referring now to FIGS. 7 and 8, there is shown respective graphs illustrating typical acceleration over time that may be experienced by the sensor 213 along the longitudinal axis. It can be seen that the acceleration is characterised by a either a negative peak 701 followed by a positive peak 703 (FIG. 7) or a positive peak 801 followed by a negative peak 803, the peaks occurring between periods 703, 705 and 803, 805 during which the experienced acceleration is relatively constant. The first peak 701, 801 corresponds to the section of the tyre 301 that includes the unit 200' striking the road surface. The second peak 703, 803 corresponds to the same section of the tyre disengaging from the road surface. The respective polarity of the peaks depends on the orientation of the sensor 213 with respect to the tyre. Accordingly, for a given orientation of the sensor 213 (which in turn depends on the orientation of the unit 200' on the tyre) the successive peaks 701, 703 and 801, 803 are negative then positive, or positive then negative depending on the direction of rotation of the tyre. This means that for a given orientation of the unit 200' on the tyre and for a given direction of movement of the vehicle, the successive peaks 701, 703 and 801, 803 are negative then positive, or positive then negative depending on which side of the vehicle is located. Hence, when the orientation of the unit 200' is known, the respective polarities of the successive peaks in the longitudinal force experienced by the unit 200 as it passes through the footprint region can be used to determine which side of the vehicle the respective wheel is mounted on. By way of example, FIG. 7 shows the longitudinal acceleration experienced by a sensor 213 on the right hand side of the vehicle, while FIG. 8 shows the longitudinal acceleration experienced by a similarly orientated (with respect to the wheel) sensor 213 when the mounted on the left hand side of the vehicle.

It is noted that the signals shown in FIGS. 7 and 8 are not necessarily representative of the output of the sensor 213, since this will depend on the type of the sensor 213. For example, an accelerometer may produce a signal that is substantially the same as those shown in FIGS. 7 and 8 (or proportional to them), whereas a shock sensor may produce a signal having a positive or negative pulse corresponding to the positive or negative peak respectively.

As with the sensor 211, sensor 213 may be implemented as a separate sensor or by a multi-axis sensor.

Advantageously, the output from sensors 211, 213 may be used together to determine whether a wheel is on the left or right side of a vehicle. This requires only two sensors, or one dual axis sensor, rather than the three sensor solution of FIG. 2. Alternatively, sensor 213 may be used without sensor 211, in which case the system 102 must use any other convenient means of determining the orientation of the unit 200' with respect to the wheel.

Figure 9:
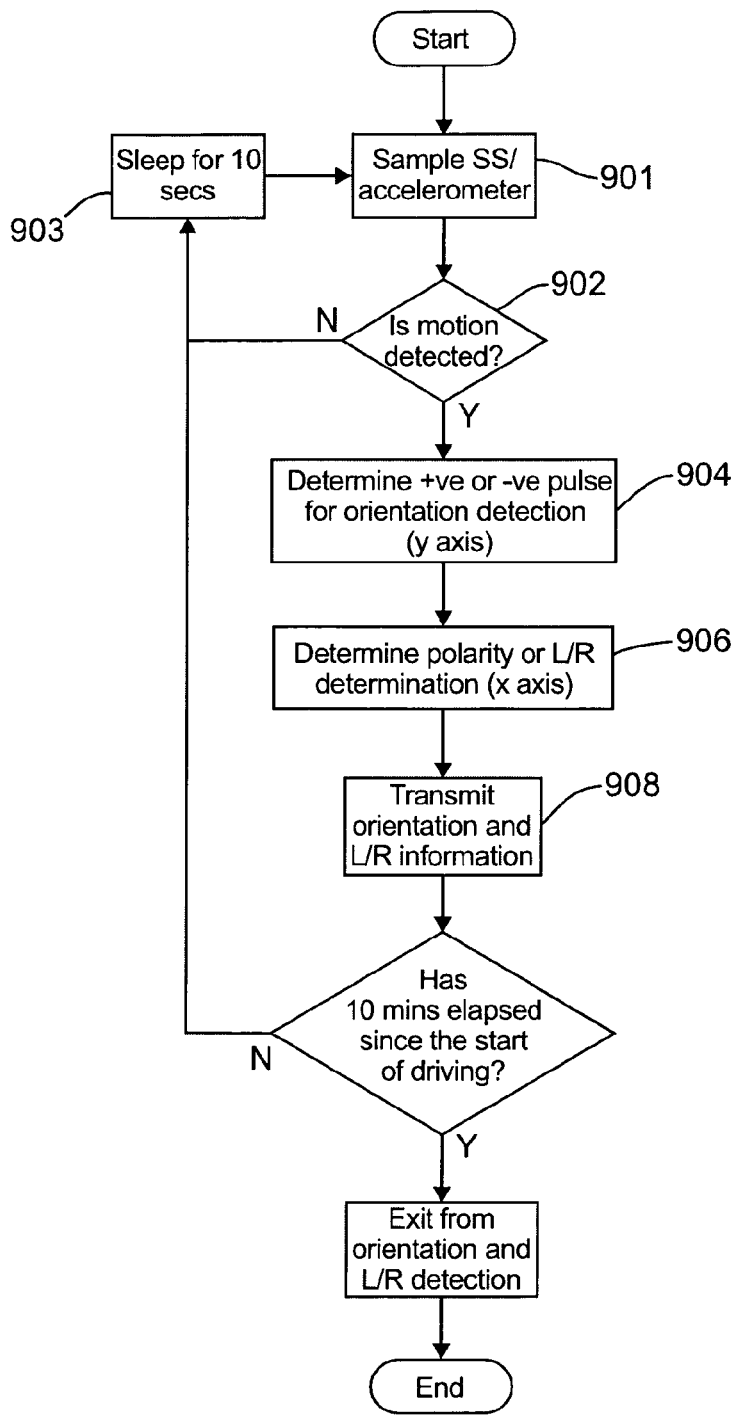
FIG. 9 is a flowchart illustrating an embodiment of the method for determining the orientation of the tyre monitoring unit using lateral forces and left/right location of the unit using longitudinal forces.

FIG. 9 illustrates an example of the operation of the system 102 when determining whether a wheel is on the left or right of a vehicle. The determination can only be made when the vehicle is moving so the system 102 initially checks periodically whether or not the vehicle is in motion (901, 902, 903). As indicated above, this can conveniently be achieved from the output signal of one or more of the sensors 210, 211, 212, 213. Once the vehicle is in motion, the system 102 determines the orientation of the tyre mounted unit 200, 200', 300 with respect to the wheel (904). Advantageously, this is achieved in the manner described above using the output of sensor 211. Next, the system 102 determines the left/right location of the wheel using the output of the sensor 213 as described above (906). In this embodiment, it is assumed that operations 904 and 906 are performed at the unit 200, 200', 300, e.g. by the controller 202, in which case the determined left/right location and, if required, orientation information are transmitted to the control unit 112 (908). Alternatively, the outputs of either or both of the sensors 211, 213 as applicable may be communicated to the control unit 112 to enable the control unit to perform either or both of operations 904, 906. Preferably, operations 904 and 906 at least are performed multiple times, e.g. periodically over a given time period, to avoid false detections, e.g. that may occur when the vehicle is reversing.

Figure 10:
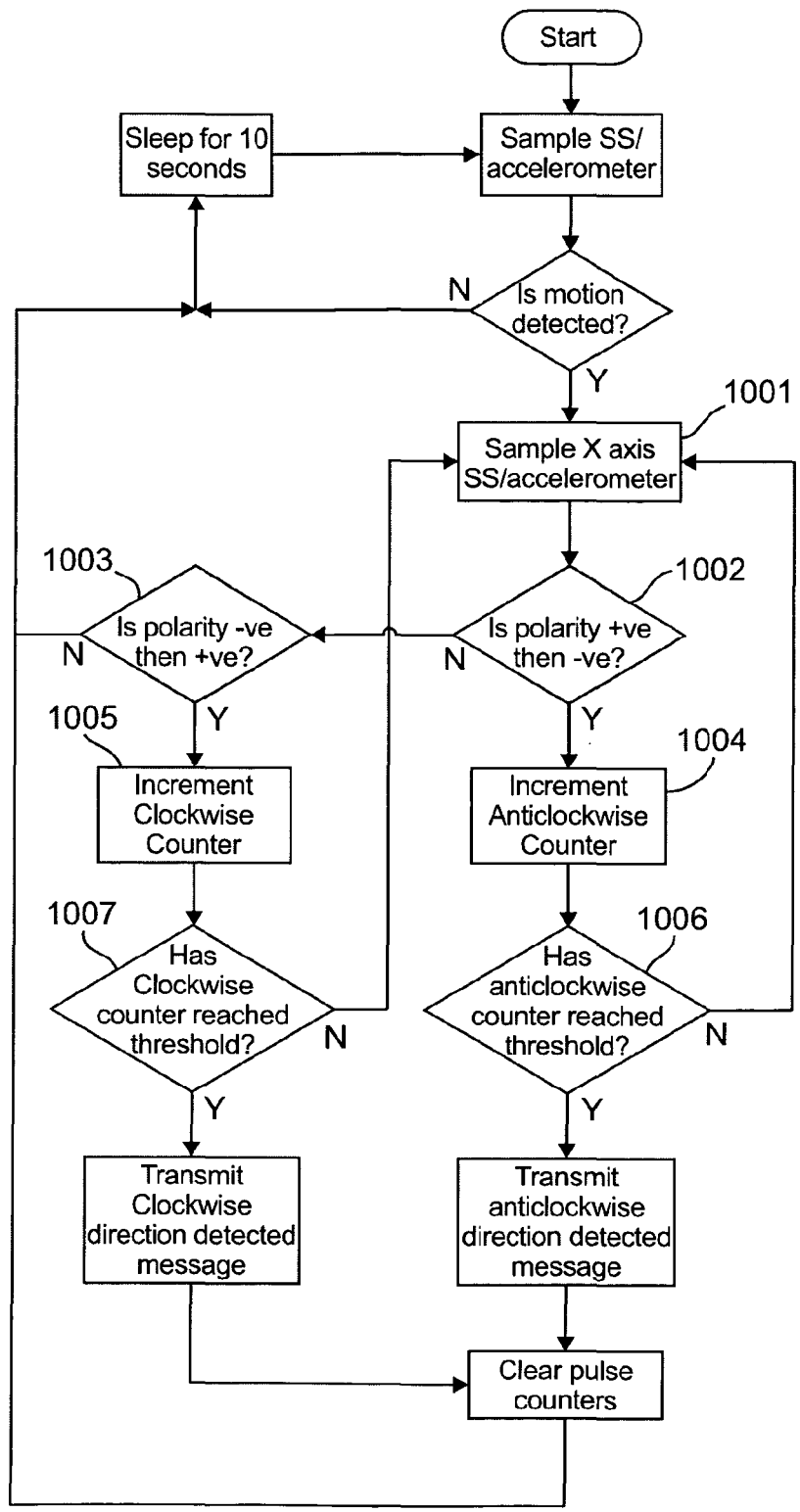
FIG. 10 is a flowchart illustrating an embodiment of a method for determining left/right location of the unit using longitudinal forces.

FIG. 10 shows an example of how left/right location may be determined for a given orientation of the unit 200'. At 1001, the output of sensor 213 is sampled and then the polarity of successive peaks is determined (1002, 1003) following which a respective counter is updated depending on whether left or right location is indicated (1004, 1005). The first counter to reach a threshold value determines whether a left or right determination is made (1006, 1007). The process may be repeated continuously or for a limited period to reduce the chances of false detection.

More generally, it will be apparent that any calculations and/or determinations based on the output of either or both of the sensors 211, 213 may be made at the unit 200, 200', 300, e.g. by the controller 202, in which case the determined left/right location and, if required, orientation information are transmitted to the control unit 112. Alternatively, the outputs of either or both of the sensors 211, 213 as applicable may be communicated to the control unit 112 to enable the control unit to perform the relevant calculations or determinations.

Sampling of the sensor outputs and related calculations and/or determinations is preferably performed repeatedly at least over a period of time that is long enough to avoid false detections, e.g. that may arise as a result of reversing in the case of left/right determination.

Optionally, orientation determination is performed when a deflation, especially complete deflation, of the tyre is determined by the system 102, since this may be an indication that the orientation of the wheel has been changed.

Figure 11:
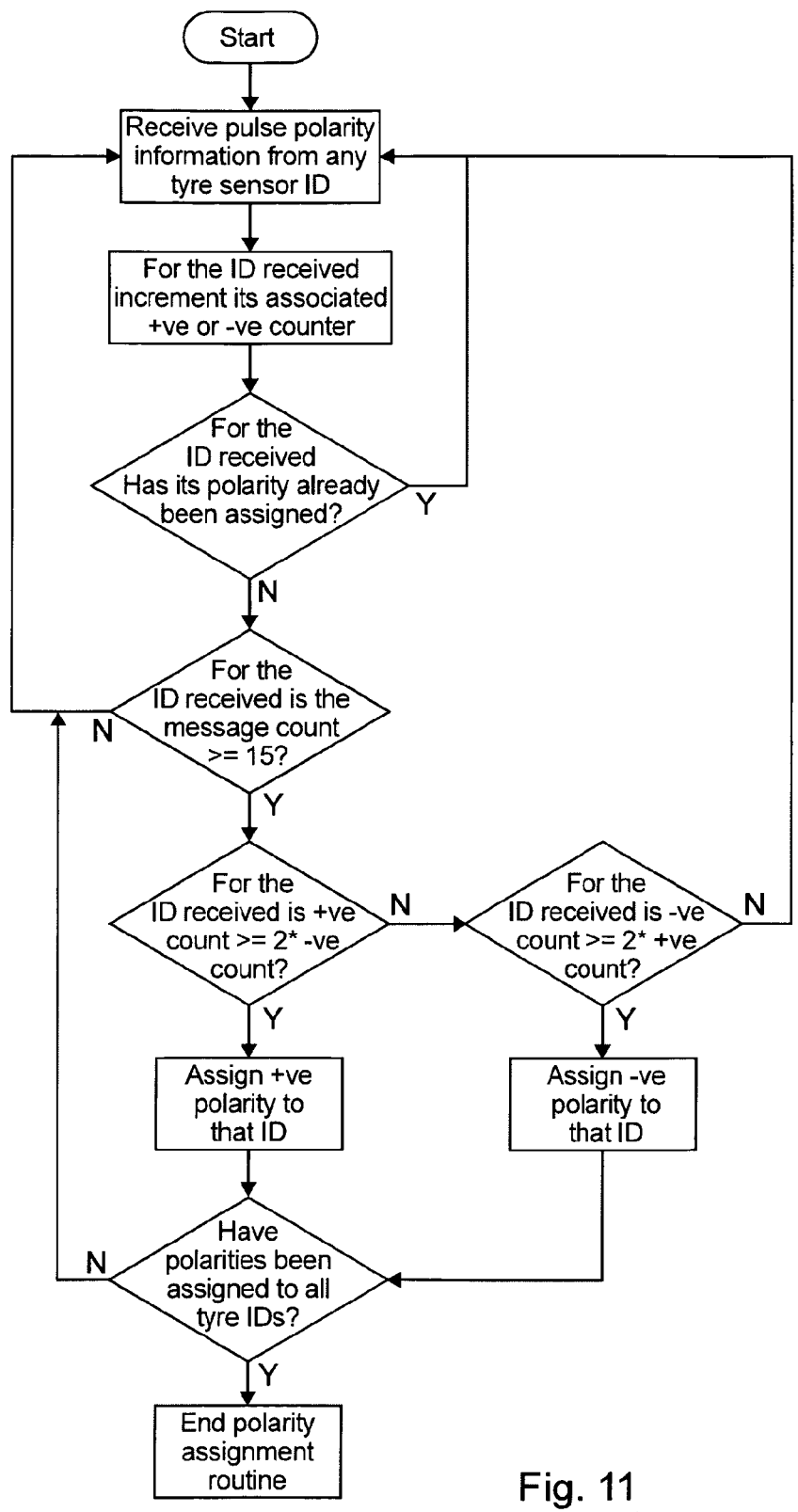
FIG. 11 is a flowchart illustrating an embodiment of part of a method for determining orientation of the tyre monitoring unit in which said determination is made remotely from the unit.

By way of example, in the flowchart of FIG. 11, which relates to orientation determination of the tyre unit 200, 200', 300, the decision as to whether the tyre unit 200, 200', 300 is facing into or away from the vehicle is made by the system 102 remotely from the unit itself (e.g. by the vehicle ECU or other system controller 132). It indicates that the ECU makes a decision on each tyre unit orientation based upon the pulse polarity indicated by each tyre unit's first 15 (or any other number of, preferably more than one) polarity assignments. The system keeps count of the respective number of positive and negative pulses received in respect of each tyre unit and, at the end of the assignment period (15 assignments in this case), the system makes an assignment decision. In this example, one assignment is chosen over the other if it has been assigned with a frequency twice or more that of the other.

Figure 12:
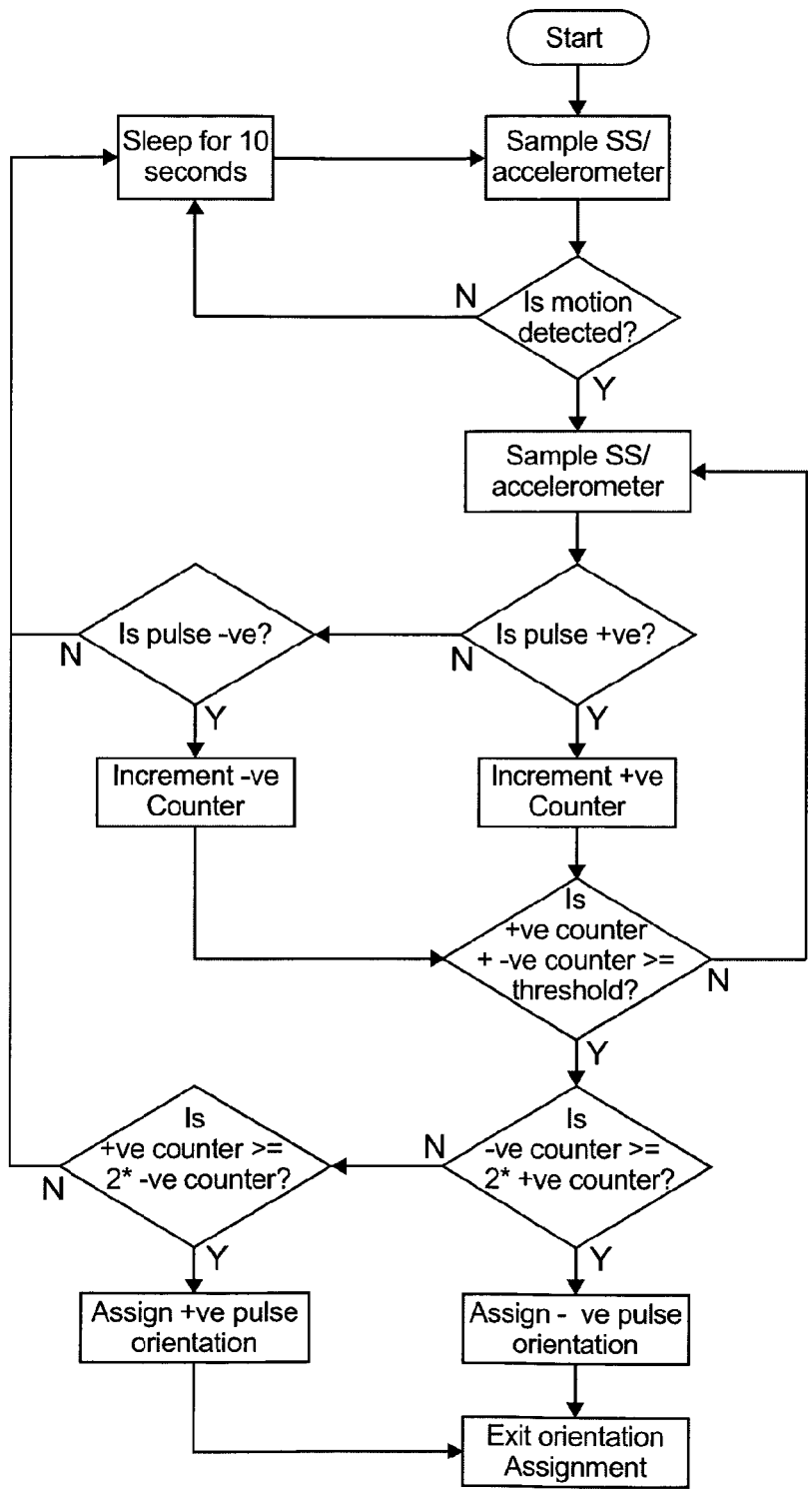
FIG. 12 is a flowchart illustrating an embodiment of part of a method for determining orientation of the tyre monitoring unit in which said determination is made at the unit.

FIG. 12 shows an alternative to FIG. 11 where the tyre unit itself determines the pulse polarity. Again, this may be achieved by maintaining a count of respective individual assignments over an assignment period and then deciding which assignment is dominant.

Figure 13:
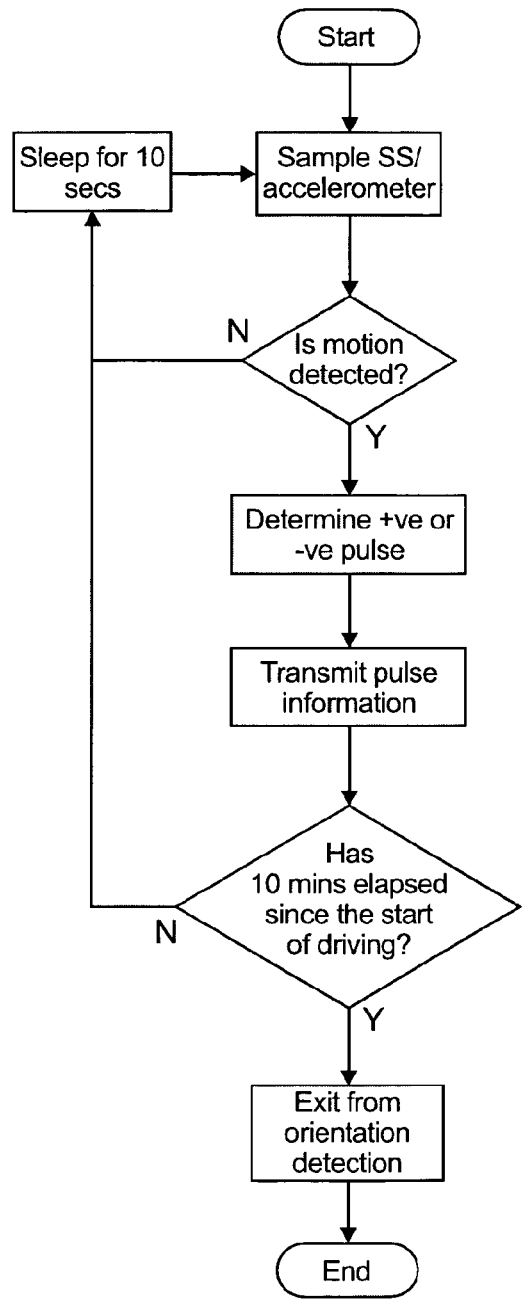
FIG. 13 is a flowchart illustrating an embodiment of part of a method for determining orientation of the tyre monitoring unit in which said unit transmits orientation polarity at regular intervals.

FIG. 13 shows a higher level flowchart where the tyre unit transmits orientation polarity every 10 seconds for the first 10 minutes of driving. It will be apparent that alternative time periods could be used. In this example, a respective counter is maintained for each polarity and a polarity assignment is made when one or other of the counts exceeds a threshold.

Figure 14:
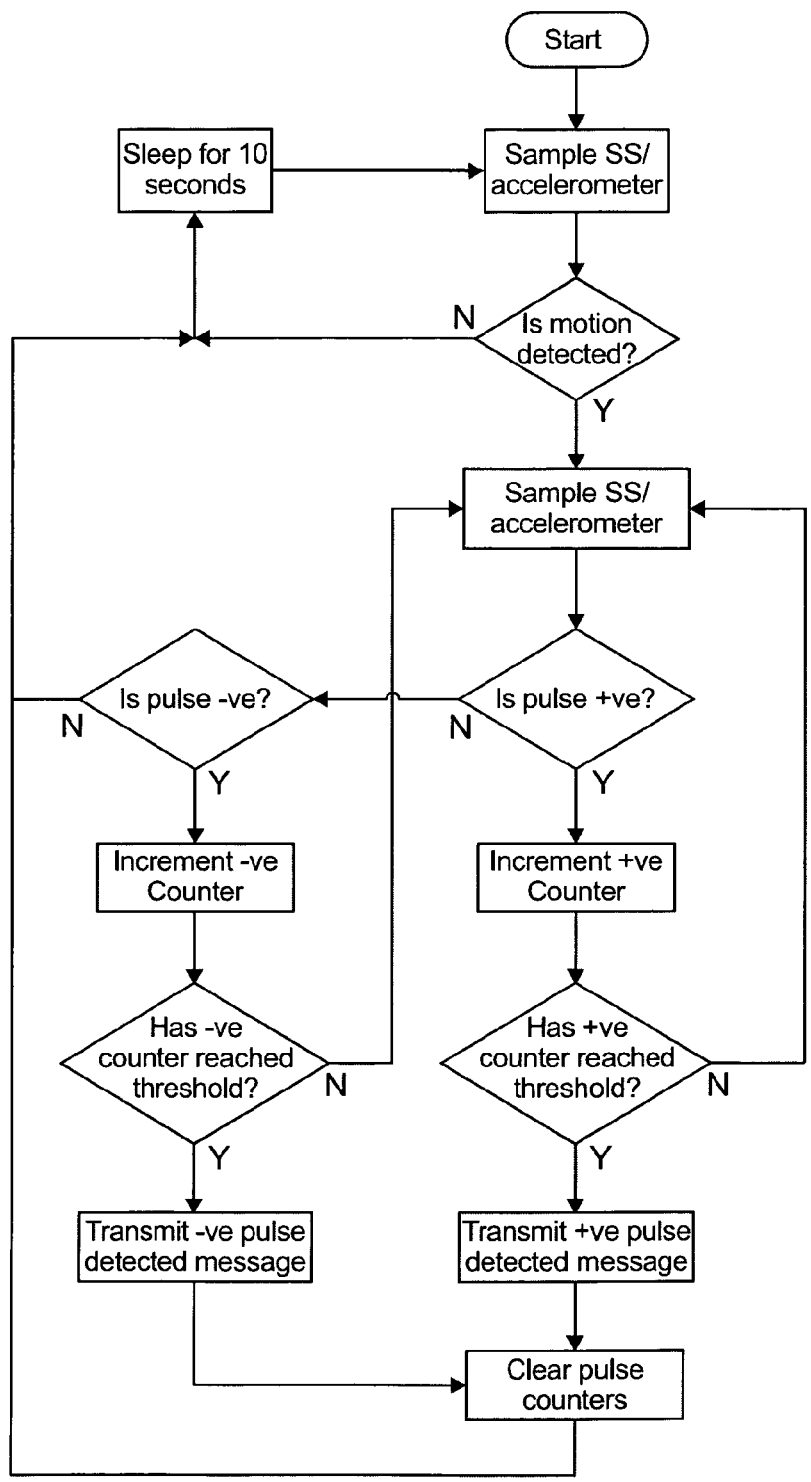
FIG. 14 is a flowchart illustrating an embodiment of part of a method for determining orientation of the tyre monitoring unit in which said sensor takes multiple samples and transmits pulse polarity based on the results of these.

In the example of FIG. 14, the tyre unit takes multiple samples of the lateral force and based on the results of these transmits a determined pulse polarity.

Figure 15:
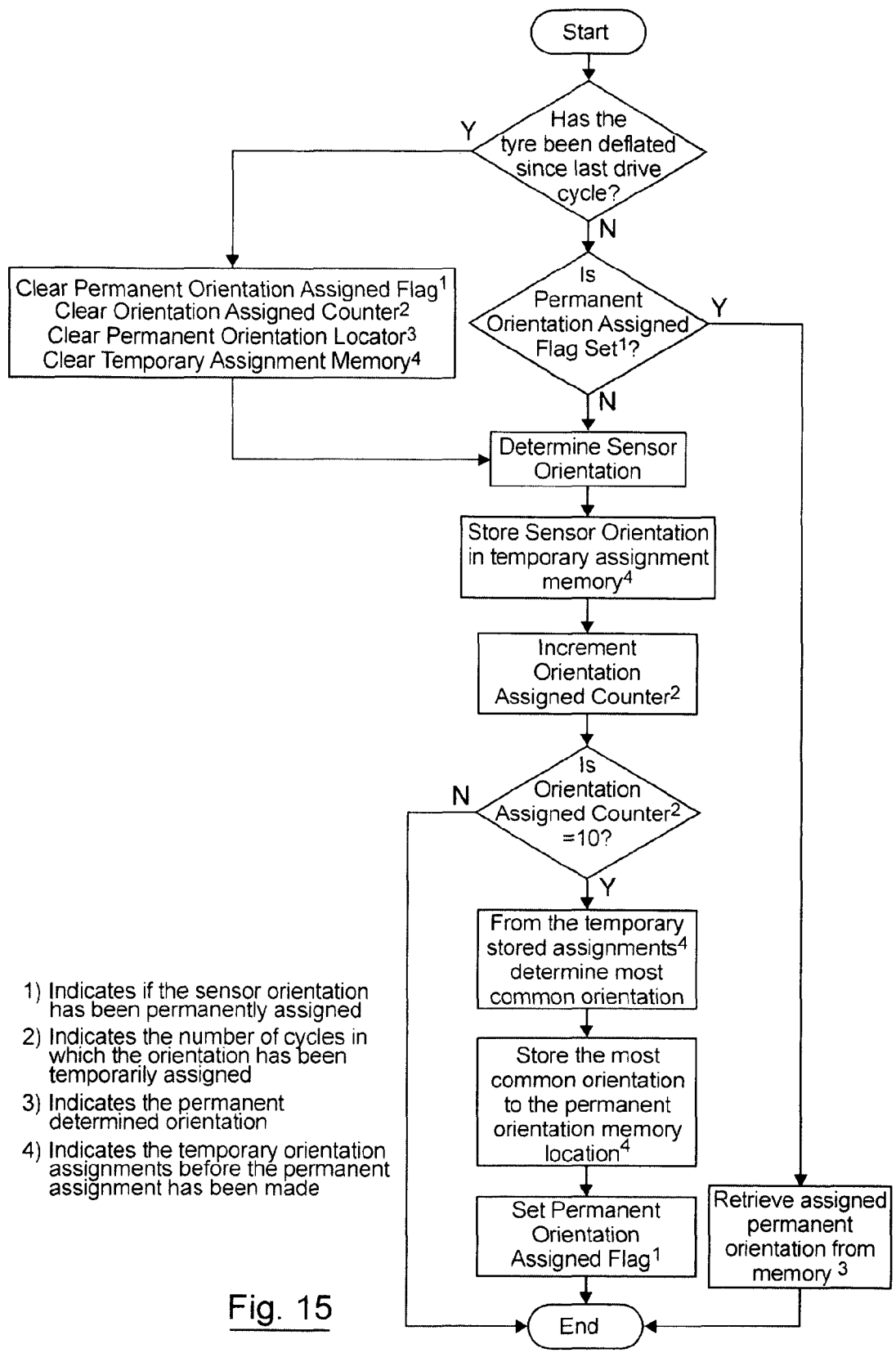
FIG. 15 is a flowchart illustrating an embodiment of part of a method for determining orientation of the tyre monitoring unit demonstrating that orientation does not have to be determined every drive cycle of the vehicle.

In the example of FIG. 15, it is shown that the orientation of the tyre unit does not have to be determined for every drive cycle. The flowchart shows that after a tyre inflation or deflation event, especially a total deflation, (during which a tyre or tyre unit could be reoriented) the orientation has only to be determined for the first, say, 10 journeys—after which there is no point in re-evaluating the orientation unless the tyre has been removed, which again may be detected by a tyre deflation, especially a total tyre deflation.

The invention is not limited to the embodiments described herein, which may be modified or varied without departing from the scope of the invention.

The invention claimed is:

1. A tire monitoring system for a vehicle, the system comprising:
    a plurality of tire units, each tire unit being mountable on a respective tire in at least a first orientation or a second orientation and comprising:
        at least one sensor for detecting one or more characteristics of the respective tire, and
        a lateral force sensor that is responsive to forces exerted on the respective tire along a lateral axis that is parallel with an axle of the vehicle on which the respective tire is mounted in use, said lateral force sensor being arranged to produce an output signal that indicates the direction of said exerted forces; and the system further comprising:
    control means arranged to determine whether said each tire unit is mounted in said first orientation or said second orientation depending on said exerted force direction indicated by said output signal.

2. A system as claimed in claim 1, wherein said control means is arranged to detect one or more peaks in said output signal and to determine whether said respective tire unit is mounted in said first orientation or said second orientation depending on the polarity of said detected one or more peaks.

3. A system as claimed in claim 2, wherein said control means is arranged to detect a first peak after a quiescent period in said output signal and to determine whether said respective tire unit is mounted in said first orientation or said second orientation depending on the polarity of said first peak.

4. A system as claimed in claim 2, wherein said control means detects said one or more peaks by the magnitude of said output signal meeting a threshold value.

5. A system as claimed in claim 1, wherein said lateral force sensor has a detection axis and is capable of determining the direction of forces exerted along said detection axis, wherein said lateral force sensor is orientated with respect to said tire unit such that, in either of said first or second orientations of said tire unit, said detection axis is substantially parallel with said lateral axis.

6. A system as claimed in claim 1, wherein, in response to said output signal indicating that said exerted force is in a direction inward of said vehicle, said control means is arranged to determine that said tire unit has adopted whichever of said first or second orientations that corresponds to said lateral force sensor being orientated to detect positive force in a direction inwardly of said vehicle, and in response to said output signal indicating that said exerted force is in a direction outward of said vehicle, said control means is arranged to determine that said tire unit has adopted the other of said first or second orientations.

7. A system as claimed in claim 1, wherein, in response to said output signal indicating that said exerted force is in a direction inward of said vehicle, said control means is arranged to determine that said tire unit has adopted whichever of said first or second orientations that corresponds to said lateral force sensor being orientated to detect positive force in a direction outwardly of said vehicle, and in response to said output signal indicating that said exerted force is in a direction outward of said vehicle, said control means is arranged to determine that said tire unit has adopted the other of said first or second orientations.

8. A system as claimed in claim 1, wherein each of the plurality of tire units further comprises a longitudinal force sensor that is responsive to forces exerted on the respective tire along a longitudinal axis that is substantially tangential to a footprint section of the tire during use, said longitudinal force sensor being arranged to produce an output signal that indicates the direction of said longitudinally exerted forces, and
wherein the control means is further arranged to detect changes in said longitudinal force direction indicated by said output signal and to determine whether a respective tire unit is mounted on the left side or the right side of said vehicle depending on said detected changes.

9. A system as claimed in claim 8, wherein said control means is arranged to detect at least two successive peaks in said output signal and to determine whether said respective tire unit is mounted on the left side or the right side of said vehicle depending on the respective polarities of said detected at least two successive peaks.

10. A system as claimed in claim 9, wherein said control means is arranged to detect a first peak after a quiescent period in said output signal and a successive second peak in said output signal, said first peak having a first polarity and said second peak having a second polarity opposite to said first polarity, and to determine whether said respective tire unit is mounted on the left side or the right side of said vehicle depending on the respective polarity of said first and second peaks.

11. A system as claimed in claim 10, wherein, for said first orientation of tire unit, said control means is arranged to determine that said tire unit is on the left hand side of the vehicle upon detecting that said first peak is positive and said second peak is negative, and to determine that said tire unit is on the right hand side of the vehicle upon detecting that said first peak is negative and said second peak is positive, and wherein for said second orientation of said tire unit, said control means is arranged to determine that said tire unit is on the left hand side of the vehicle upon detecting that said first peak is negative and said second peak is positive, and to determine that said tire unit is on the right hand side of the vehicle upon detecting that said first peak is positive and said second peak is negative.

12. A system as claimed in claim 9, wherein said control means detects said peaks by the magnitude of said output signal meeting a threshold value.

13. A system as claimed in claim 8, wherein said longitudinal force sensor has a detection axis and is capable of determining the direction of forces exerted along said detection axis, wherein said longitudinal force sensor is orientated with respect to said respective tire unit such that, in either of said first or second orientations of said tire unit, said detection axis is substantially parallel with said longitudinal axis.

14. A system as claimed in claim 8, wherein said control means comprises a central controller separate from said tire unit, said tire unit including a transmitter for transmitting one or both of said lateral force sensor and longitudinal force sensor output signals to said central controller.

15. A system as claimed in claim 8, wherein said longitudinal force sensor comprises a shock sensor.

16. A system as claimed in claim 8, wherein said longitudinal force sensor comprises an accelerometer or an accelerometric device.

17. A system as claimed in claim 1, wherein said control means comprises a tire unit controller provided in said tire unit.

18. A system as claimed in claim 1, wherein said lateral force sensor comprises a shock sensor.

19. A system as claimed in claim 1, wherein said lateral force sensor comprises an accelerometer or an accelerometric device.

20. A system as claimed in claim 1, wherein said at least one sensor comprises a pressure sensor arranged to measure fluid pressure in the tire, the tire unit further including a transmitter for transmitting pressure data obtained from the output of said pressure sensor, the system further comprising a system controller for receiving said pressure data from each tire unit.

21. A tire unit for a tire monitoring system for a vehicle, the tire unit being mountable on a tire in at least a first orientation or a second orientation and comprising:
at least one sensor for detecting one or more characteristics of the tire, and
a lateral force sensor that is responsive to forces exerted on the tire along a lateral axis that is parallel with an axle of the vehicle on which the tire is mounted in use, said lateral force sensor being arranged to produce an output signal that indicates the direction of said exerted forces, and wherein said tire unit includes, or is co-operable with control means arranged to determine whether the tire unit is mounted in said first orientation or said second orientation depending on said exerted force direction indicated by said output signal.

22. A method of determining the orientation of a tire unit of a vehicle tire monitoring system, the system comprising a plurality of tire units, each tire unit being mountable on a respective tire in at least a first orientation or a second orientation, the method comprising:
detecting a force exerted on the respective tire along a lateral axis that is parallel with an axle of the vehicle on which the respective tire is mounted in use;
determining the direction of said force exerted along said lateral axis; and determining whether the tire unit is mounted in said first orientation or said second orientation depending on said determined direction of said exerted force.

* * * * *